United States Patent [19]
Whiteley et al.

[11] Patent Number: 5,265,750
[45] Date of Patent: Nov. 30, 1993

[54] LIGHTWEIGHT CYLINDER CONSTRUCTION

[75] Inventors: John Whiteley, Clitheroe; Alfred Wood, Heyside; Leslie Powdrill, Oswaldtwistle, all of England

[73] Assignee: Hollingsworth U.K. Limited, Accringtron, England

[21] Appl. No.: 664,080

[22] Filed: Mar. 4, 1991

[30] Foreign Application Priority Data

Mar. 5, 1990 [GB] United Kingdom ............... 9004850
Dec. 20, 1990 [GB] United Kingdom ............... 9027684

[51] Int. Cl.$^5$ ............................................. B65D 6/00
[52] U.S. Cl. ........................... 220/4.31; 220/4.26; 220/4.33; 220/4.34; 220/444; 220/466; 220/469; 220/653; 220/654; 220/681; 220/682; 220/683; 52/223.3; 52/248; 52/249; 52/593
[58] Field of Search ............ 220/4.01, 4.08, 4.09, 220/4.11, 4.16, 4.26, 4.31, 4.33, 4.34, 444, 466, 469, 565, 677, 681, 682, 683, 651, 653, 654, 691; 52/223.3, 223.7, 248, 249, 593, 594

[56] References Cited

U.S. PATENT DOCUMENTS

| 338,948 | 3/1886 | Gillette | 220/466 X |
|---|---|---|---|
| 1,086,295 | 2/1914 | Hillman | 52/223.3 |
| 1,299,884 | 4/1919 | Webber | 52/249 |
| 2,074,592 | 3/1937 | Rowell | 52/223.3 |
| 2,929,236 | 3/1960 | Steward et al. | 52/223.3 |
| 3,166,212 | 1/1965 | Resos | 220/565 X |
| 3,201,108 | 8/1965 | Kramer | 220/466 X |
| 3,291,437 | 12/1966 | Bowden et al. | 220/4.11 X |
| 3,488,965 | 1/1970 | Chesnov | 52/594 X |
| 3,588,027 | 6/1971 | Bowden | 220/682 X |
| 3,609,930 | 10/1971 | Crandal | 220/565 X |
| 3,948,406 | 4/1976 | Papanicolaou et al. | 220/565 X |
| 3,951,294 | 4/1976 | Wilson | 220/4.31 |

FOREIGN PATENT DOCUMENTS

| 0094781A1 | 11/1983 | European Pat. Off. | |
|---|---|---|---|
| 1951445 | 10/1970 | Fed. Rep. of Germany | |
| 7310945 | 2/1974 | Netherlands | 220/444 |
| 0494323 | 1/1937 | United Kingdom | |
| 2055127 | 2/1981 | United Kingdom | |

Primary Examiner—Allan N. Shoap
Assistant Examiner—Stephen Cronin
Attorney, Agent, or Firm—Cort Flint; Henry S. Jaudon

[57] ABSTRACT

A modular cylinder comprises a plurality of, in this case 24, modules each having a tongue to engage a groove of its neighbor and each either having a camming ramp to engage a camming ramp of its neighbor, or a filler rod inserted between adjacent modules at each interface. Where the camming means are provided, (n−1) of the modules can be placed into engagement to define an almost complete cylinder and can then be strained in a radially outward direction to provide space for the final module which is placed in position by sliding longitudinally of the gap. Where the filler rods are used, all of the n modules may be loosely assembled in a first operation and the filler rods can be inserted in a second operation to pre-stress the cylinder. The radially outer panel of each module has a biconvex cross-section whereby the outer surface thereof defines a sector of the cylindrical surface of the finished modular cylinder but the neutral axis of bending of the panel is straight and parallel to the tangent of the outer surface at the center of the cross-section of that outer panel. If desired, at least one reinforcing hoop may be placed inside the modular cylinder to increase its rigidity.

12 Claims, 6 Drawing Sheets

LIGHTWEIGHT CYLINDER CONSTRUCTION

FIELD OF THE INVENTION

The present invention relates to a lightweight cylinder construction which has structural rigidity but without being made from the solid.

PRIOR ART

Conventionally cylinders, particularly those used in heavy machinery such as textile cards, are produced from the solid, either by being cast in the form of a solid cylindrical metal block and possibly having been machined away to leave a hollow construction, or by having been cast in hollow form and subsequently machined internally and externally for finishing.

Previous efforts towards reducing the weight of such cylinders has involved the choice of lightweight metals for the casting, but there is a limit as to the weight reduction possible because of the eventual lack of structural rigidity which is necessary for precision equipment (for example cards where the clearance between the fine points on the card clothing wire on the cylinder and those of any cooperating concave carding plate and/or flats is critical to optimum uniformity of the carding action obtained).

British Patent Specification 0494323 (Riveau) discloses a cylinder for a rotary printing machine comprising a core having dove-tailed thereon a series of modules comprising a cylindrical jacket about the core and hence providing a substantially solid printing cylinder.

European Patent Application 0094781 Carding Specialists (Canada) Ltd discloses a "bend" for a textile card in which the bend is made up of individual segments which are not connected to one another but which are instead all mounted on a side flange of the side plate of the card. The card cylinder itself is shown in FIG. 4 as being solid, and in FIG. 1 the cylinder is hollow but supported on a spider. The anular structure forming the cylinder is apparently formed in a single piece as is conventional for carding cylinders.

OBJECTS OF THE INVENTION

It is a first object of the present invention to provide a cylinder which is hollow but has a structural strength which is greater than possible hitherto with hollow cylinders.

It is a second object of the present invention to provide a hollow cylinder which is itself formed with a cylindrical internal cavity bounded by an angular cylindrical wall in which the wall is itself hollow to reduce the overall weight of the cylinder.

It is a further object of the present invention to provide a cylinder formed of a plurality of identical modules of lightweight construction which are self-locking to comprise the cylinder structure.

It is a still further object of the present invention to provide a cylinder for a textile card which cylinder is lighter than hitherto and thereby requires less energy to maintain the card in rotation, but significantly less energy to accelerate the card to working speed from standstill, and significantly less time and braking heat generated during braking of rotation of the cylinder from working speed to standstill.

It is a still further object of the present invention to provide a method of assembling a cylinder from a plurality of identical modules, with ease of stressing the cylinder so that on completion it is in a pre-stressed state.

SUMMARY OF THE PRESENT INVENTION

In accordance with a first aspect of the present invention, there is provided a hollow cylinder comprising end plates and a hollow cylindrical member formed of a plurality of interengaging modules each extending parallel to the axis of said cylinder and assembled in side-by-side relationship in a circular array, each said module having spaced wall portions which, in the assembled configuration of the cylinder, define at least part of the radially inner faces of the modular cylinder and the radially outer faces thereof.

A second aspect of the present invention provides a module defining a segment of a modular cylinder for assembly with a plurality of identical modules in a circular array to define said modular cylinder, said module being of hollow form manufactured by extrusion and including at one side at least one tongue and at the other side at least one socket, positioned so that the or each tongue of one said module can engage a respective socket of an adjacent said module, and the various modules being provided with radially outer abutment surfaces which ensure that in the assembled condition of a set of said modules in an array occupying a full circle the radially outer panels of the modules are in compression and the radially inner panels of the modules are in tension.

Preferably the modules may be extruded with open-ended geometry, and more preferably end plates may be provided for butting up against the ends of the cylindrical array of assembled modules for the purposes of defining end walls of the cylinder.

Conveniently each of the modules may include all the means necessary for joining it to the adjacent module in the array. More conveniently each module may be identical to its neighbours, in which case one possibility is for the module to have a projecting tongue at one side which conforms with a socket on the other side whereby the tongue of each module may engage the socket of its neighbour(s).

Where such tongue and socket engagement is provided, each module may include cam means for cooperating with cam means on its neighbouring module(s) for driving the tongue firmly into engagement with the socket.

Advantageously each said module may have along each of two opposite edges close to said radially outer panel a longitudinal recess such that the recess of one said edge will register with the recess of the other edge of an adjacent module, said recesses extending right up to an end of said module.

Preferably the modules are all shaped such that in the assembled configuration of the modular cylinder, the cylindrical external surface of the cylinder is at a region where the modules are all in compression, and at the radially inwardly facing surface of the modular cylinder the relevant portion of the module is in tension measured in the peripheral direction. This latter arrangement of the compression and tension of the assembled modular cylinder is particularly advantageous in the case of a textile carding cylinder which is subsequently clad with card clothing wire tending to bind around the external cylindrical surface of the cylinder and hence to impose additional compressive stress on the external surface of the cylinder.

Advantageously the part of each module which defines the cylindrical outer surface of the assembled modular cylinder may have a biconvex cross-section, resulting in the neutral axis of bending of that wall of the module being straight as opposed to being convex to follow the cylindrical contour of the modular cylinder.

A third aspect of the present invention provides a method of assembling a modular cylinder consisting of n identical modules in engagement in a cylindrical array, comprising assembling together $(n-1)$ of said modules and leaving a gap for the final module, straining said array of $(n-1)$ modules to increase the width of the gap remaining for the final module sufficiently to allow engagement of the final module with its immediate neighbours to either side of the gap, sliding the final module longitudinally into the gap until it is in register with the $(n-1)$ modules of the array, and then relaxing the strain.

A fourth aspect of the invention provides a method of assembling a modular cylinder consisting of n identical modules in engagement in a cylindrical array, comprising assembling together the n-modules in a loose-fitting cylindrical configuration, and stressing said assembly by inserting filler means between the adjacent surfaces of the modules at each interface between the adjacent modules, said filler means fitting between the sidewalls of the modules near the radially outer panels defining the exterior of the cylinder, whereby insertion of the final said filler means stresses the cylinder in the required manner.

BRIEF DESCRIPTION OF THE DRAWINGS

In order that the present invention may more readily be understood the following description is given, merely by way of example, with reference to the accompanying drawings, in which.

DESCRIPTION OF THE PREFERRED EMBODIMENTS

Figure 1:
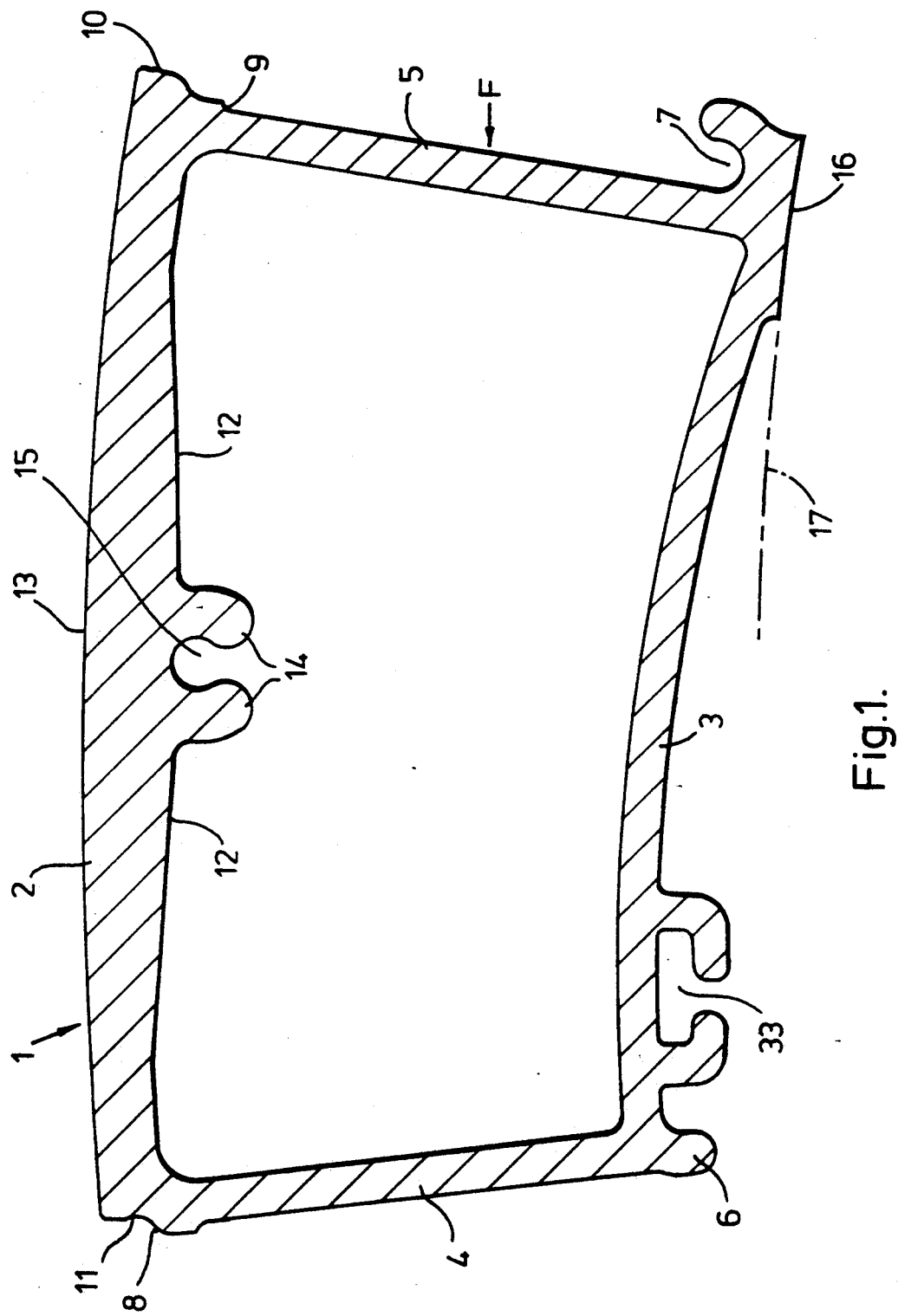
FIG. 1 is a transverse sectional view of a cylinder module in accordance with the present invention.
Figure 3:
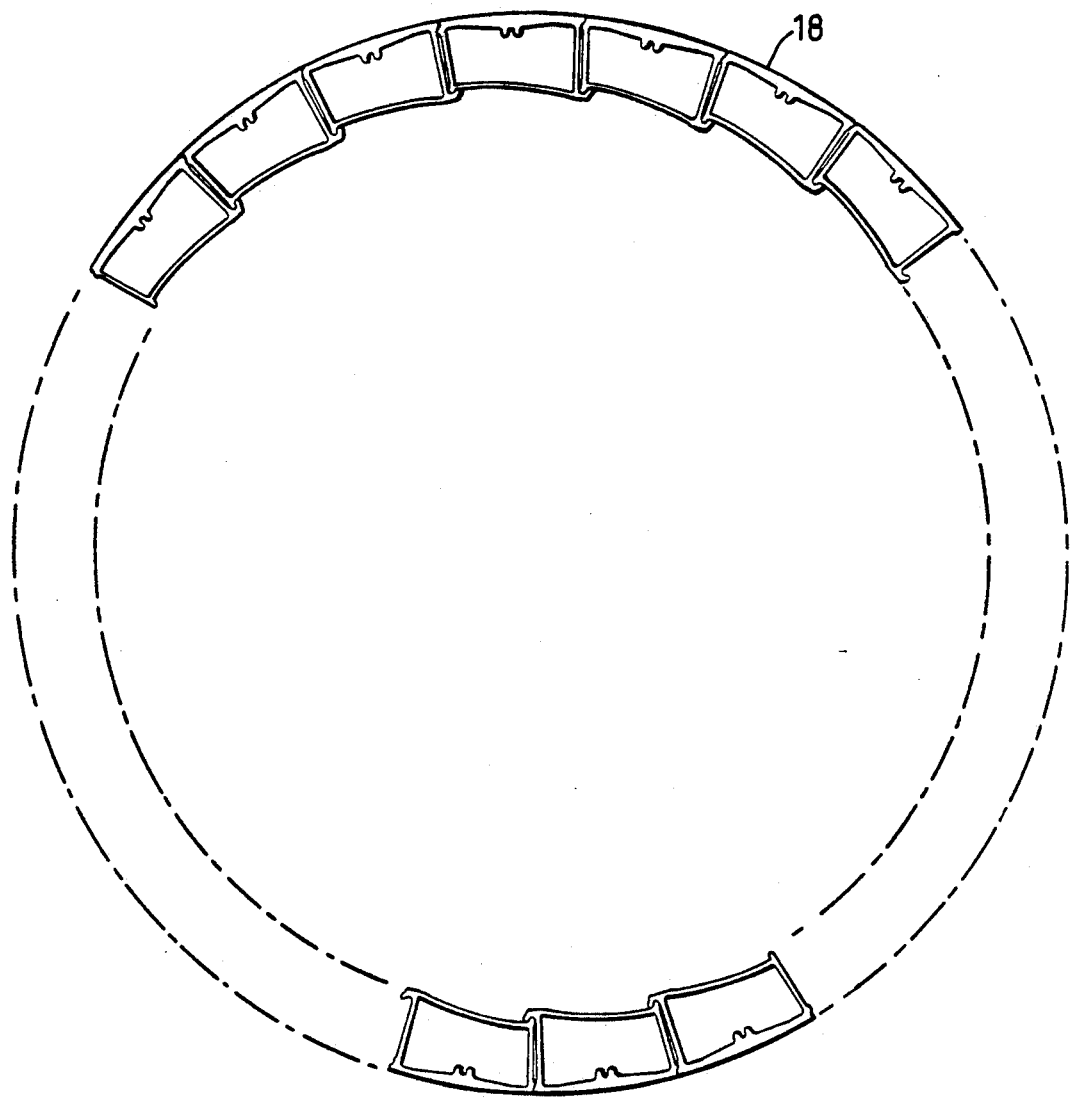
FIG. 3 is a still further reduced scale drawing showing the finished cylinder.

FIG. 1 shows a hollow extruded module 1 which is one of twenty four identical such modules to be used to assemble a hollow cylinder 18 shown in FIG. 3, in this case for use as the main carding cylinder of a textile fibre card.

The module is generally in the form of a box-section beam having an outer wall 2 which will define the exterior of the cylinder, and an inner wall 3 which will be facing radially inwardly of the assembled modular cylinder, these inner and outer walls being joined by generally radially extending sidewalls 4 and 5.

In the preferred embodiment the "beam" is closed except at its ends, but in practice any alternative construction providing an external surface of a desired configuration, and providing the necessary strength for the cylinder may be used.

Figure 2:
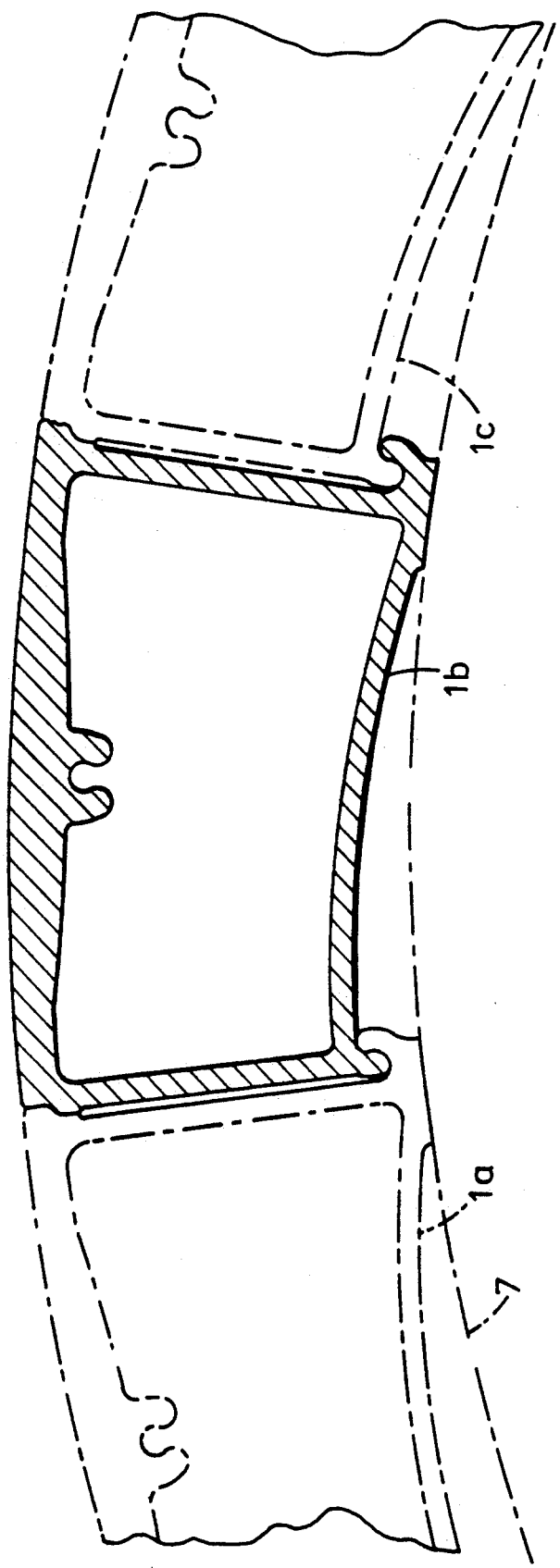
FIG. 2 is a view, on a reduced scale as compared with FIG. 1, showing three of the modules assembled in a part-cylindrical configuration.

In order to assemble the modules together, each has a tongue 6 at one end of the inner wall panel 3 and a suitably arranged recess 7 at the opposite end of that same wall panel 3, for the purposes of allowing the tongue 6 of one module 1b to engage in the recess or socket 7 of its immediate neighbour 1a, and so on, as shown in FIG. 2.

In order to ensure that the tongue 6 engages firmly in the socket or recess 7, the end of the sidewall 4 remote from the tongue 6 includes a camming ramp 8 which engages with a suitably positioned camming ramp 9 on the end of the other sidewall 5 remote from the socket 7. This has the result that when two adjacent modules 1a and 1b are pressed together by a force acting in the direction of the arrow F of FIG. 1 the camming engagement of the ramps 8 and 9 causes the tongue 6 to press firmly into the socket 7.

In order to ensure that there is no loose fit of the modules one against another, the profile of the tongue 6 is carefully chosen to conform to the profile of the socket 7 to avoid lateral slapping even in the unstressed condition of the modules.

In order to impose a circumferential compression on the assembled modular cylinder, the end of the sidewall 5 remote from the socket 7 has a projection 10 which bears against a shoulder 11 at the end of the other sidewall 4 remote from the tongue 6, as each two adjacent modules 1a and 1b are pressed against one another in the circumferential direction.

By suitable dimensioning of the distance measured in the circumferential direction between the rightwardly facing end of the projection 10 and the cooperating part of the shoulder 11, on the one hand, and the distance between centres of the tongue 6 and of the recess or socket 7, on the other hand, it is possible to ensure that in the assembled condition the wall 2 is maintained in compression while the wall 3 is maintained in tension. This is particularly advantageous when the assembled modular cylinder is to be wound around with a binding medium such as card clothing wire 40 (FIG. 2) in the case of a carding cylinder.

In order to provide the necessary strength and buckling resistance to the radially outer wall panel 2 of each module, the panel 2 is preferably shaped as shown in FIG. 1 in that it has a generally inwardly convex inner surface 12 which complements the outwardly convex surface 13 defining the external surface of the assembled modular cylinder, in such a way that, despite the cylindrical exterior of its surface 13 the neutral axis of bending 31 (in FIG. 4) of that panel 2 is substantially straight and is in this case parallel to the tangent 32 to the external surface 13 of that module at the mid-point of the wall 2.

Each module optionally includes a pair of bent ribs 14 defining between them a generally circular recess 15 for a purpose to be described therebelow.

The operation of assembling the modules 1 to form a hollow cylinder with the ability to withstand structural loading is as follows:

Initially the various modules, such as 1a, 1b and 1c in FIG. 2, are placed in a suitable configuration (for example by standing them upright on the floor surface with one end of each module engaging the floor, or by mounting them on a suitable former ring or within a former socket) and the tongue 6 of one module 1b is engaged with the socket 7 of its neighbour 1a, and so on.

Figure 5:
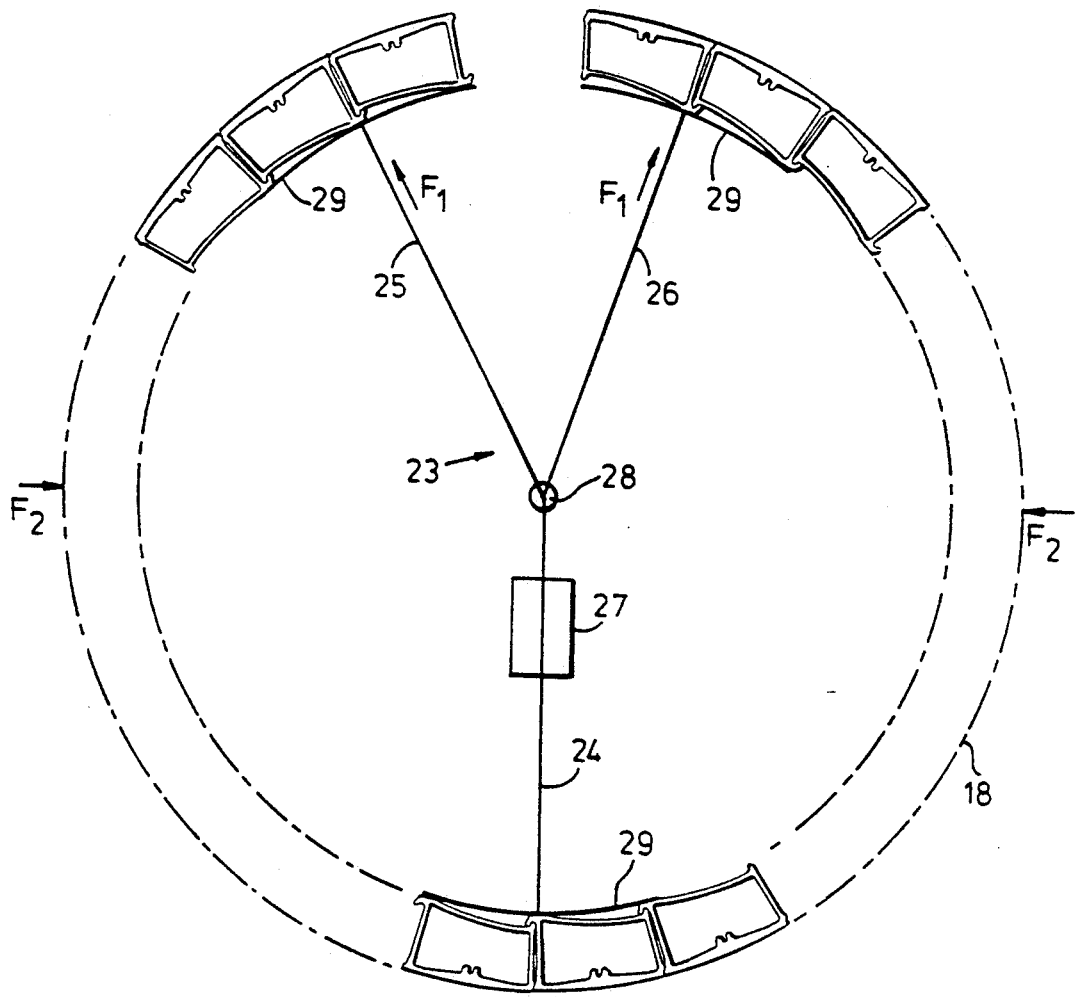
FIG. 5 is a diagrammatic view illustrating the method of assembling the cylinder comprising the modules of FIGS. 1 and 2.

After twenty three of the twenty four modules have been assembled in this way, normally simply by positioning each one of them so that it engages with its tongue in the groove of its neighbour, the almost complete cylindrical structure is then deformed by applying an outward strain at the ends of the array which will receive the sidewalls 4 and 5 of the missing module. Ideally some means, such as spreader 23 in FIG. 5, are provided for ensuring that the bending moment applied to the almost assembled modular cylinder is distributed uniformly over the entire cylinder. For this purpose there may be load spreading pads 24 or other similar means to apply a relatively uniform deflection around the peripheral direction of the modular cylinder.

While the almost complete cylinder is thus strained, the final module is placed in position by sliding it axially into the gap remaining, whereby its tongue 6 slides along the socket or recess 7 of one of its neighbours and its socket or recess 7 slides along the tongue 6 of the other neighbouring module until the final module is correctly aligned side-by-side with the other twenty three.

At this stage, release of the "opening" bending moment on the other twenty three modules will allow the twenty fourth module to take its share of the load which will be evenly distributed around the modular cylinder and hence the resulting engagement of the ramps 8 and 9 of the final module with its immediate neighbours will help to ensure a tight-fit of the tongues 6 and sockets 7 around the modular cylinder.

If desired, one or other or both of the tongue 6 and the socket 7 may have a slightly tapering profile in order to provide some form of wedging action as the tongue 6 is driven into a cooperating socket 7 as a result of the camming engagement of the ramps 8 and 9.

As an alternative to the preferred tongue and socket interconnection of the modules 1 illustrated, the modules may instead be provided with cooperating dove-tailed formations.

FIG. 5 shows a suitable tool 23 for spreading the almost complete modular cylinder as, for example, comprising a Y-shaped spreader having the stem 24 of the Y engaging the interior of the almost complete modular cylinder (for example adjacent modules numbers 11 and 12 (where module number 1 is at one side of the gap and module number 23 is at the other side of the gap to receive module number 24)), and then the branches 25 and 26 of the Y may engage the radially inward surface of the modular cylinder adjacent modules numbers 1 and 23 to apply a radial expansion force $F_1$ thereagainst. A suitable hydraulic or screw jack 27 on the stem of the Y can be operated to spread the branches of the Y (preferably by having the branches pivotally connected to the stem of the Y at 28). Load spreading pads 24 are provided on the stem and branches. Preferably a transverse radial compression is applied (for example at modules 6 and 18 in this 24 module example) to exert a diametral compressive force $F_2$ to cause the faces of modules 1 and 23 to be presented at the best orientation to receive module 24 readily.

Once the modular cylinder has been assembled in this way, end plates 41 (FIG. 3) may be attached. For example, in the embodiment shown in FIG. 1, the end plate may have twenty four clearance holes drilled near its periphery, each one receiving a suitable bolt or screw which penetrates the clearance hole and bites into the socket 15 between the bent ribs 14 on the inward side of the outer panel 2 of the module 1 (FIG. 1). For this purpose the sockets 15 are preferably tapped, by use of a suitable guiding fixture, before assembly of the modules to form the cylinder.

The centre of each end plate 41 may provide means for mounting a bearing or stub axle 42 on the cylinder, for the purposes of mounting the finished modular cylinder for rotation.

Although the above description refers to a modular cylinder comprising twenty four identical modules, any smaller or larger number of modules may be chosen, but of course the shape of each module will differ with such differing numbers of modules, even if the same general operating principle of the modules is followed.

FIG. 1 shows that there is a radially inwardly facing part-cylindrical surface 16 of each module which can engage an inner former ring, and that the main curved radially inwardly facing panel 3 of each module diverges from the cylindrical configuration of the finished modular cylinder as one moves away from the socket 7 and towards the tongue 6 of the module 1. The panels 3 are deliberately curved about an axis parallel to the axis of rotation of the cylinder in order to allow the effect of straightening them, when the almost complete modular cylinder is strained by application of a bending moment to open the gap for the last module to be inserted, to impart extra flexibility for the straining to be facilitated in the appropriate direction of bending of the cylinder. The curvature of the panel 3 is generally in the form of a spiral on the cross-section shown in FIGS. 1 and 2.

The general cylindrical notional cylinder of which the surface 16 forms part is illustrated in chain-dotted lines at 17. This will coincide with the exterior of the reinforcement ring 17, where fitted.

FIG. 2 shows the assembly of three of the modules 1 of FIG. 1 in engagement with one another during the early stages of assembling a said cylinder 18. This clearly shows the irregular radially inner profile, resulting from the staggering of the tongues 6 and recesses 7, and the generally regular radially outer profile defined by the surfaces 13 of the three modules illustrated.

Figure 4:
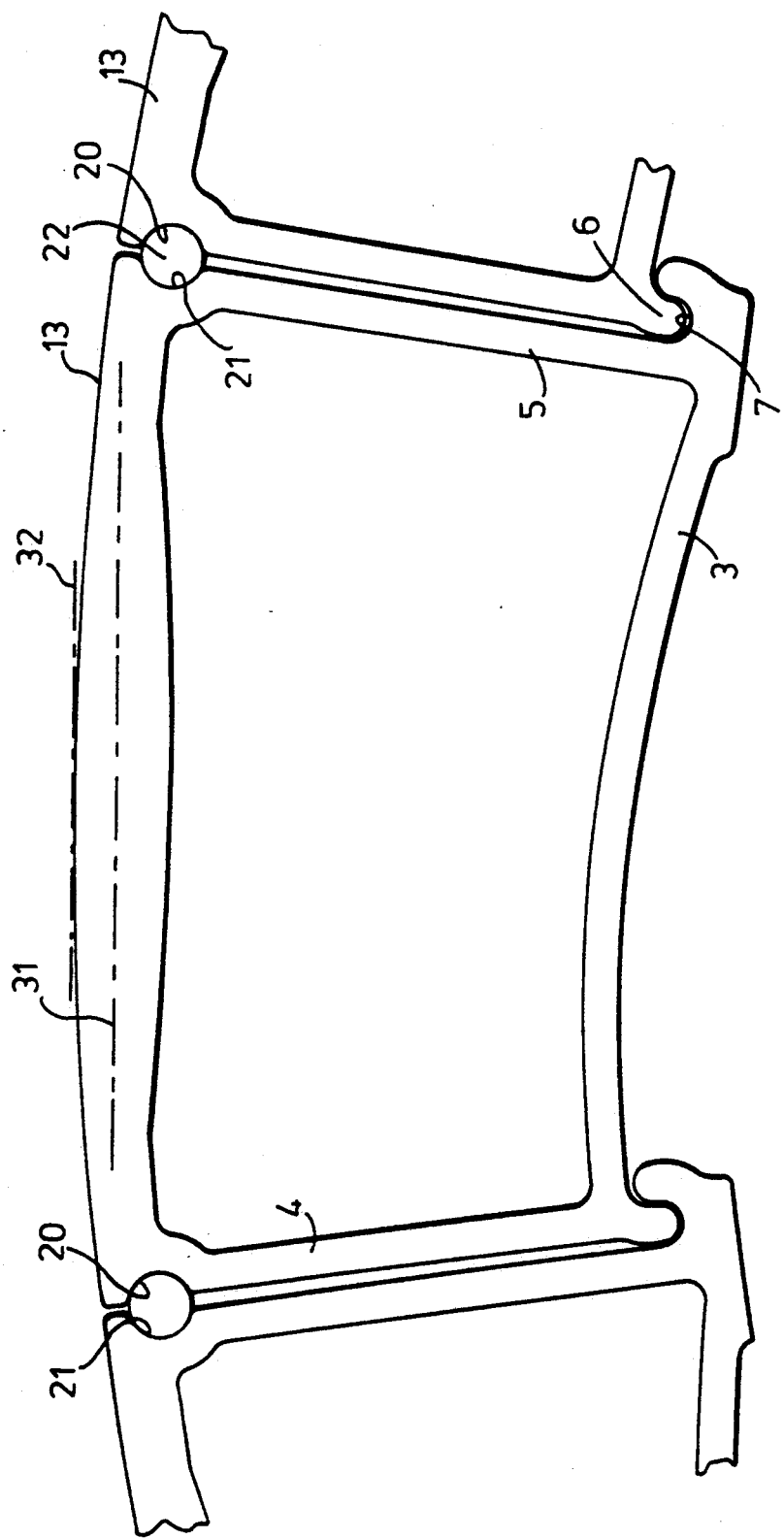
FIG. 4 shows a view corresponding to FIG. 2, but illustrating a modified form of the modules forming the cylinder.

FIG. 4 shows an embodiment of the cylinder module which is generally similar to that of FIGS. 1 to 3 but which has additional hemi-cylindrical recesses 20 and 21 along the side edges adjacent the radially outer panel 13 of the module. As shown in the central module in FIG. 4, the left-hand hemi-cylindrical recess is referenced 20 and the right-hand is referenced 21 such that, when the modules are assembled, the recess 21 to the right of the central module is in register with the other (left-hand) recess 20 of the next adjacent module on the right, and the left-hand recess 20 is in register with the other (right-hand) recess 21 of the next adjacent module on the left.

Although the recesses are shown as being hemi-cylindrical, they could be of any suitable form which can receive a filler which in the present embodiment is in the form of a cylindrical rod 22. With a cylindrical rod it is possible for the recesses 21 and 22 to be non-cylindrical but, for example, V-shaped. With other cross-sections of filler instead of the cylindrical rods 22 a different profile of recess 20 and 21 altogether may be used.

In order to assist insertion of the filler rods 22, they have one end tapered to assist in threading them into the registered recesses 20 and 21.

Another difference between the modules of FIG. 4 and those of FIGS. 1 to 3 is that there is no evidence of the bent ribs 14 to assist in clamping end plates to the modular cylinder. However, some other form of securing of the end plates may be incorporated. For example, the filler rods 22 could be used to mount end plates by having suitable turned-down ends to engage in holes drilled in the end plates.

The method of assembling the modular cylinder with the modules of FIG. 4 is somewhat different from that of FIGS. 1 to 3, and is as follows:

The entire assembly of modules is laid out in a cylindrical configuration with the modules standing up on end and the various tongues 6 and grooves 7 interengaged. With the radially outermost panels 13 of the modules arranged so that their edges almost touch at the interface between one module and the next the fit is relatively loose but the cylindrical configuration can be achieved without difficulty, even when the last module of the set is inserted into the available space. It will be recalled that with the embodiment of FIGS. 1 to 3 the insertion of the last module required the entire assembly of the previous (n−1) modules to be strained to make space for it.

Once the various modules have all been loosely assembled as described above, the various filler rods 22 are driven into the gaps defined by the registered recesses (in this case the cylindrical openings defined by the two hemi-cylindrical recesses 20 and 21 at each interface between modules).

In order to facilitate insertion of the rods, the loosely assembled cylinder may be distorted into an elliptical configuration either by expanding a diameter from within the cylinder (in order to cause that diameter to tend to become the major axis of an ellipse, or by contracting a diameter from outside to cause that contracted diameter to become the minor axis of an ellipse. When such an elliptical configuration has been achieved, rods are inserted around the ends of the major diameter, where the radius of curvature of the ellipse is smallest and the gaps between the surfaces 20 and 21 are widest. If a single "elliptical" deformation is not enough to facilitate insertion of all the rods, then this process may be repeated several times with different diameters chosen for contraction or expansion, in order to shift the regions of smallest radius of curvature of the assembly of segments around the array so as to generate the tightest curvature at a region where the rods have not yet been inserted.

Figure 6:
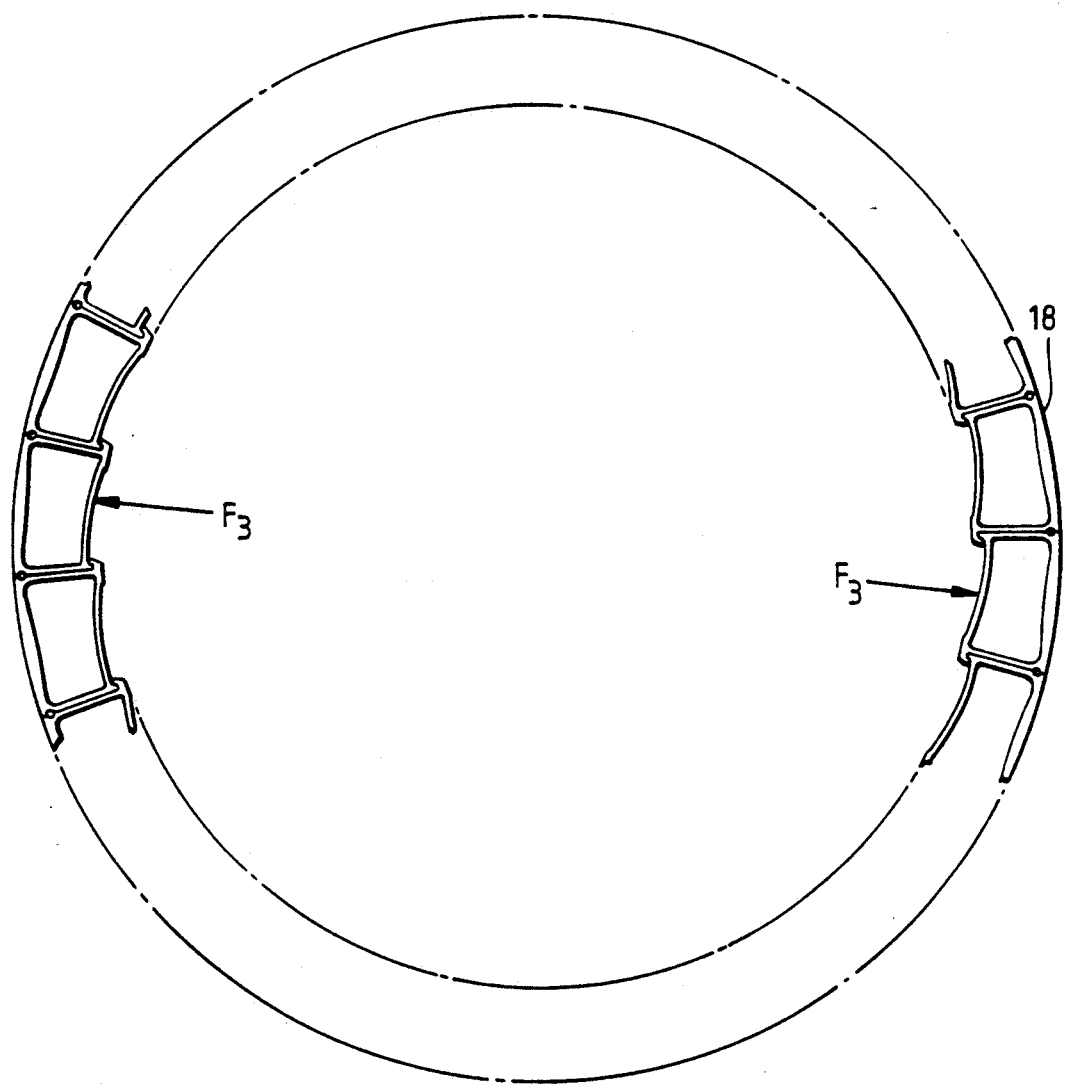
FIG. 6 is a view corresponding to FIG. 5, but showing the assembling of a cylinder comprising the modules of FIG. 4.

By way of example, FIG. 6 shows an outward deformation force $F_3$ applied at the 9 o'clock and 3 o'clock positions of the cylinder, so as to generate tightest curvature around those points of application of the internal force to facilitate insertion of the rods locally.

Alternatively, a radially inward force may be applied, for example at the 9 o'clock and 3 o'clock positions, in order to contract that diameter and to generate the tightest curvature at the 12 o'clock and 6 o'clock positions to facilitate insertion of the rods there.

Driving in the last rod will be difficult, but will be helped by virtue of the optional tapering of the leading end of the filler rod this can be achieved without difficulty.

Once the various filler rods 22 have been inserted, the radially outer panels 13 will all have been placed in compressive stress and it has been found that this is the configuration in which the cylinder preserves its structural integrity most reliably.

In the case of a carding cylinder manufactured by the method of the present invention, the outer panel 2 of each module will be thick enough to provide for the possibility of machining of the radially outwardly facing surface of the assembled modular cylinder 18 for the purposes of allowing precise dimensioning of the finished cylinder and for dressing the cylinder to receive the necessary card clothing wire. However, mere grinding of the radially outer surface may suffice for preparing the surface to receive carding wire.

As indicated above, the material used for each extruded module 1 is preferably aluminium or an aluminium alloy, and the hollow box-beam type construction allows a very lightweight module to be formed such that the engagement of the designed number of such modules to form a cylinder, with a radially outer compressive stressing and a radially inner tensile stressing of the finished modules, allows a particularly impressive structural integrity of the finished modular cylinder to be obtained despite the extreme light weight of the cylinder as compared with the conventional carding cylinder using a hollow cylindrical casting which has a radial distance substantially equal to the length of a sidewall 4 or 5 of the module 1.

If desired, such a modular cylinder may be reinforced by at least one radially inwardly arranged reinforcement hoop (not shown) which has its cylindrical exterior conforming to the notional cylindrical interior 17 of the modular cylinder, and in this way the modules can be braced against radial deformation in that the tension in the inwardly facing module panels 3 of the cylinder 18 can be responsible for applying compression to the exterior of the reinforcement hoop, provided appropriate measures are taken during assembly to ensure that there is a tight fit upon relaxation of the modular cylinder 18 and the reinforcement hoop.

If absolutely necessary, more than one such reinforcement may be employed.

If desired, each module extrusion may include at least one section such as is shown at 33 in FIG. 1 to enable the radially inner panels of the modules to be drawn tightly radially inwardly against the reinforcement hoop by means of T-headed bolts and nuts and drilled bores extending radially through the hoop.

An alternative or additional reinforcement mechanism relies on the injection of a rigid polyurethane foam into the cavities bounded by each module 1.

In order to hold the loosely-assembled hollow modules in the correct axial registration, it may be advantageous to provide notches extending down the side walls of the modules along what would be radii of the finished cylinder, and to insert dowels into the space defined by the registered notches when the correct axial alignment has been obtained. This may either be carried out by previously notching the modules, or by assembling the modules in a particular configuration and then drilling along a radial direction at each interface so as to provide a bore having the appropriate calibre to receive the dowels.

When the assembly operation is complete, the space around each dowel may be filled with a resin or any other filling medium, prior to the step of grinding the external surface of the hollow cylindrical body, so that the grinding operation results in a smooth cylindrical surface, even at the location of a radially extending dowel.

The grinding operation may be carried out using a belt grinder, i.e. a grinder having a recirculating abrasive belt which is arranged to have one flat run bearing on the rotating assembled cylinder during driving of the belt to circulate around its endless path.

We claim:

1. A module defining a segment of a modular cylinder for assembly with a plurality of identical modules in a circular array to define said modular cylinder, said module being of hollow form having opposed first and second side panels with outwardly facing surfaces and joined by opposed panels adapted to define radially outer and radially inner panels of the module in said modular cylinder, said module being manufactured by extrusion and including at said first side panel at least one tongue and at said second side panel means defining at least one socket, positioned so that the tongue of said module can engage a respective said socket of an adjacent said module, and the module being provided with means for ensuring that in the assembled condition of a set of said modules in an array occupying a full circle the radially outer panel of the module is stressed in compression and the radially inner panel of the module is stressed in tension.

2. A module according to claim 1, wherein said at least one tongue projects in a direction generally radially of the circular cylinder segment defined by said module and said at least one socket comprise means defining at least one recess which is open in the same generally radial direction as said at least one tongue, and further including camming means at the radially outer part of said module on the outwardly facing surface of said side panels thereof, to ensure that pressing of two adjacent modules circumferentially against one another with said at least one tongue of one engaged in said at least one recess of the other causes camming inter-engagement between said camming means to thrust said at least one tongue more firmly into said at least one recess.

3. A module according to claim 2, wherein said means for ensuring that the module is stressed in the assembled condition comprise, at said radially outer panel of each module, a projection at one side and a shoulder at the other side for abutting engagement with the projection of an adjacent module.

4. A module according to claim 2, and wherein said means for ensuring includes means defining at least one groove formed along said outwardly facing surface of each of the first and second side panels of the module, whereby one of said at least one groove of said first side panel of one module is in register with a respective one of said at least one groove of the second side panel of an adjacent identical module in the assembled condition to define a pair of registered said grooves, and further including a filler member to be inserted in said pair of registered grooves.

5. A module according to claim 1, wherein said module is a box beam, and wherein said radially outer panel of the cylinder segment defined by the module is a panel of said box beam, said radially outer panel having a biconvex form with a neutral axis of bending of said panel, considered in a transverse cross-section through the module, which is rectilinear and is generally parallel to a tangent to the module at the mid-point of said radially outer panel between the two side panels of the module.

6. A module according to claim 1, and including on the interior of said module a pair of bent ribs turned towards one another to define therebetween generally circular recess means for engagement with a respective bolt or screw to secure an end plate in place on the module.

7. A module according to claim 1, wherein said radially inner panel is curved around an axis extending parallel to the longitudinal axis of a cylinder to be formed of several such modules.

8. A module according to claim 7, wherein the curvature is generally as an arc of a spiral as viewed in cross-section of said cylinder.

9. A module according to claim 1, wherein the hollow centre of the module is filled with rigid polyurethane foam.

10. A hollow cylinder having an axis of rotation and comprising:
   (a) a hollow cylindrical member having radially inner and outer faces and formed of a plurality of interengaging modules each extending parallel to said axis of rotation of said cylinder and assembled in side-by-side relationship in a circular array, each said module having spaced wall portions which, in the assembled configuration of the cylinder, define at least part of said radially inner face of the modular cylinder and said radially outer face thereof;
   (b) end plates connected to ends of said modules; and
   (c) means for stressing the modules to have said wall portions defining the radially outer face of the modular cylinder stressed in compression and said wall portions defining the radially inner face of the modular cylinder stressed in tension.

11. A hollow cylinder having an axis of rotation and comprising:
   (a) a hollow cylindrical member having radially inner and outer faces and formed of a plurality of interengaging modules each extending parallel to said axis of rotation of said cylinder and assembled in side-by-side relationship in a circular array, each said module having spaced wall portions which, in the assembled configuration of the cylinder, define at least part of said radially inner face of the modular cylinder and said radially outer face thereof;
   (b) end plates connected to ends of said modules; and
   (c) at least one reinforcement ring as a tight fit within said hollow cylindrical member and engaging said radially inner face thereof at a location between the ends of each module.

12. A hollow cylinder having an axis of rotation and comprising:
   (a) a hollow cylindrical member having radially inner and outer faces and formed of a plurality of interengaging modules each extending parallel to said axis of rotation of said cylinder and assembled in side-by-side relationship in a circular array, each said module having spaced wall portions which, in the assembled configuration of the cylinder, define at least part of said radially inner face of the modular cylinder and said radially outer face thereof;
   (b) end plates connected to ends of said modules; and
   (c) means for stressing the modules to have said wall portions defining the radially outer face of the modular cylinder stressed in compression and said wall portions defining the radially inner face of the modular cylinder stressed in tension, wherein the means for stressing the modules comprise filler means to be inserted at a respective interface between adjacent modules, near said radially outer face of the modular cylinder to cooperate with said filler means of the other interfaces whereby insertion of the last said filler means places the entire cylinder under the desired stress.

* * * * *